(12) United States Patent
Tan

(10) Patent No.: US 7,108,379 B2
(45) Date of Patent: Sep. 19, 2006

(54) PROJECTOR FOR ADJUSTING A PROJECTED IMAGE SIZE AND LUMINANCE DEPENDING ON VARIOUS ENVIRONMENTS

(75) Inventor: Ming-Che Tan, Taipei (TW)

(73) Assignee: BenQ Corporation, Tao-Yuan Hsien (TW)

( * ) Notice: Subject to any disclaimer, the term of this patent is extended or adjusted under 35 U.S.C. 154(b) by 230 days.

(21) Appl. No.: 10/709,464

(22) Filed: May 7, 2004

(65) Prior Publication Data

US 2004/0223120 A1    Nov. 11, 2004

(30) Foreign Application Priority Data

May 9, 2003    (TW) ................. 92112746 A

(51) Int. Cl.
G03B 21/14    (2006.01)
G03B 21/26    (2006.01)
H04N 3/22    (2006.01)

(52) U.S. Cl. .................. 353/69; 353/30; 348/745; 348/747

(58) Field of Classification Search ............... 353/69, 353/70, 122, 97, 121, 42, 30, 29; 356/3.02, 356/3.05, 3.16, 10, 16, 601–603, 606–608, 356/609, 612, 634; 348/745, 747
See application file for complete search history.

(56) References Cited

U.S. PATENT DOCUMENTS

| 4,954,962 | A  | * | 9/1990 | Evans et al. ............. 701/28 |
| 5,114,224 | A  | * | 5/1992 | Miyamoto et al. ........ 353/122 |
| 5,455,647 | A  | * | 10/1995 | Fujiwara ................. 353/101 |
| 6,292,171 | B1 | * | 9/2001 | Fu et al. ................. 345/156 |
| 6,554,431 | B1 | * | 4/2003 | Binsted et al. ............ 353/28 |
| 2004/0184013 | A1 | * | 9/2004 | Raskar et al. ............ 353/121 |
| 2005/0128437 | A1 | * | 6/2005 | Pingali et al. ............. 353/69 |

* cited by examiner

*Primary Examiner*—W. B. Perkey
*Assistant Examiner*—Andrew Sever
(74) *Attorney, Agent, or Firm*—Winston Hsu

(57) ABSTRACT

A projector includes a housing, an image module for projecting onto a screen toward a front side, a detecting module for detecting distances from the projector to the front side and from the projector to the back side, a processor for adjusting luminance of the projected image from the image module based on the distances from the projector to the front side and from the projector to the back side.

24 Claims, 9 Drawing Sheets

PROJECTOR FOR ADJUSTING A PROJECTED IMAGE SIZE AND LUMINANCE DEPENDING ON VARIOUS ENVIRONMENTS

BACKGROUND OF INVENTION

1. Field of the Invention

The present invention provides a projector, and more specially, to a projector capable of adjusting the screen size and luminance depending on various environments.

2. Description of the Prior Art

In conference briefings, the host can project the related materials or graphs on a screen with projectors to have the participants better understand the discussion. However, with the advance of video/audio equipment and storage media, such as high power stereos and large capacity DVDs, normal families can also enjoy the same real-time perceptive feeling as in a home theater through the extra-large screen projected from the projector with the combination of projectors and stereos, which makes the use of projectors gradually extend into normal families.

However, while the technology of optical engines and illuminating lightning goes further and further, the luminance which the projectors can achieve also gets stronger. However, power consumption becomes larger in the mean time. Yet, the operating environments and purposes often differ considerably; for example, the luminance of projectors required in briefings is stronger than that in families, and stronger luminance is needed in more open operating environments to grant the participants clearer vision. But the luminance of projectors mostly requires manual adjustment according to actual situation now, which is very inconvenient for users who are not familiar with the operation of projectors. Although there are some projectors, which can adjust its luminance automatically, such as the projector disclosed by Taiwan Patent No. 399742, which employs a photo diode to detect the ambient luminance of surroundings and according to which adjusts the luminance of projected beams automatically, such adjustment of the projector luminance according to the luminance detected by the diode is not correctly available because the luminance should change with the length of indoor space. For example, in spaces of large length, the projected luminance from projectors requires higher power to have the clear image on the screen. But, in spaces of shorter length, the projector only requires lower power for projected image with identical luminance. Therefore, the conventional projectors can only operate normally in spaces of specific fixed length but not correctly adjust projecting power with different indoor spaces. Besides, conventional projectors cannot calculate the position at which the projector should be arranged depending on indoor spaces, and notify the users how to adjust the position, either. Consequently, the users can only set up the projectors with personal subjective feelings, resulting in inexact arrangement position of the projector in indoor space.

SUMMARY OF INVENTION

It is therefore a primary objective of the claimed invention to provide a projector to solve the aforementioned problem that the setup position and luminance have to be adjusted manually with change of environments.

According to the claimed invention, a projector includes a housing, an image module for projecting onto a screen toward a front side, a detecting module for detecting distances from the projector to the front side and from the projector to the back side, a processor for adjusting luminance of the projected image from the image module based on the distances from the projector to the front side and from the projector to the back side.

It is an advantage of the claimed invention that through detecting the actual distance from the projector to the left, right, front, and back side of the indoor space, the ideal distance from the projector to the screen is obtained, and, accordingly, the projecting luminance is capable of being adjusted.

These and other objects and the advantages of the claimed invention will no doubt become obvious to those of ordinary skill in the art after having read the following detailed description of the preferred embodiment, as illustrated by the included figures and drawings.

DETAILED DESCRIPTION

Figure 1:
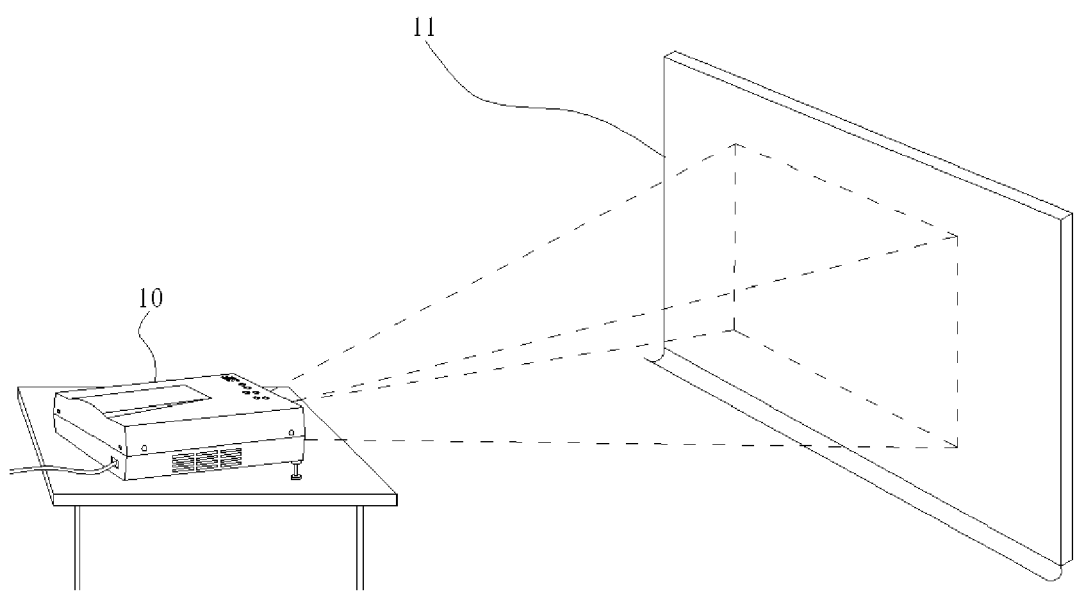
FIG. 1 illustrates a projector projecting to a screen.
Figure 2:
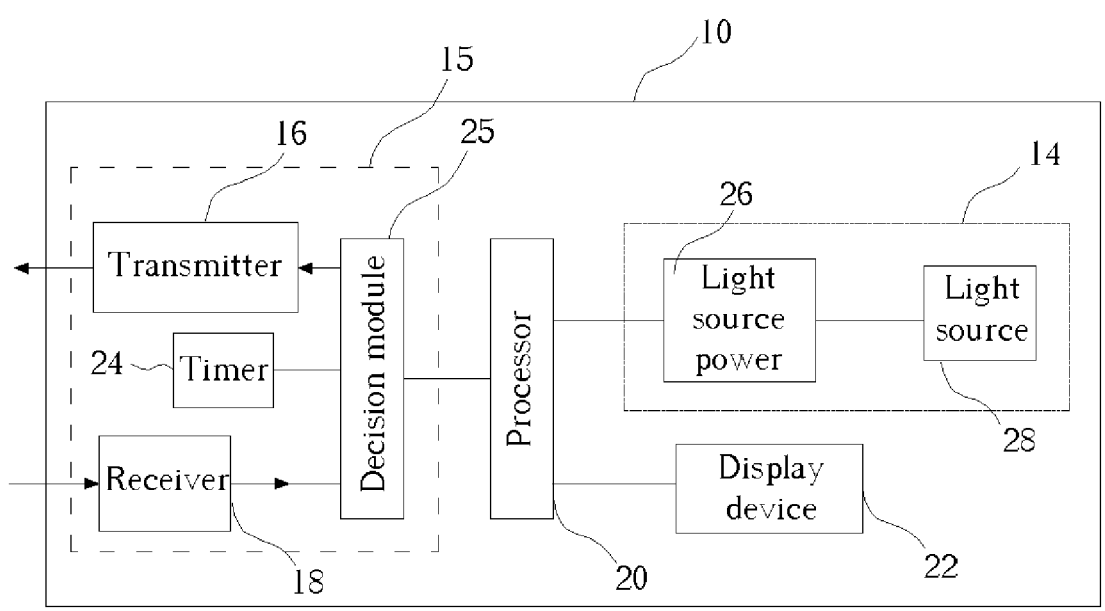
FIG. 2 is a block diagram of the projector according to the present invention.

Please refer to FIG. 1 and FIG. 2. FIG. 1 illustrates a projector 10 projecting to a screen 11. FIG. 2 is a block diagram of the projector 10 according to the present invention. The projector 10 comprises a housing, an image module 14 for projecting onto the screen 11 toward a front side, a detecting module 15 for detecting distances from the projector 10 to the front side and from the projector 10 to the back side, a processor 20 for adjusting luminance of the projected image from the image module 14 based on the distances from the projector 10 to the front side and from the projector 10 to the back side, and a display device 22. The detecting module 15 contains a transmitter 16, a receiver 18, a decision module 25, and a clock 24 connected with the decision module 25. The detecting module 25 determines distances from the projector 10 outwards based on the fact that the clock 24 counts the period from a detecting signal transmitted by the transmitter 16 to the detecting signal reflected and received by the receiver 18. The image module 14, used for projecting image onto the screen 11 in the front side of the projector 10, contains a power 26 and a light source 28. Both the transmitter 16 and the receiver 18 are capable of rotating respectively to transmit and receive the detecting signal in various directions. For example, when the transmitter 16 transmits the detecting signals respectively toward the front, back, left and right sides of the projector 10, the receiver 18 can receive the detecting signals reflected from the front, back, left and right sides of the projector 10.

Figure 3:
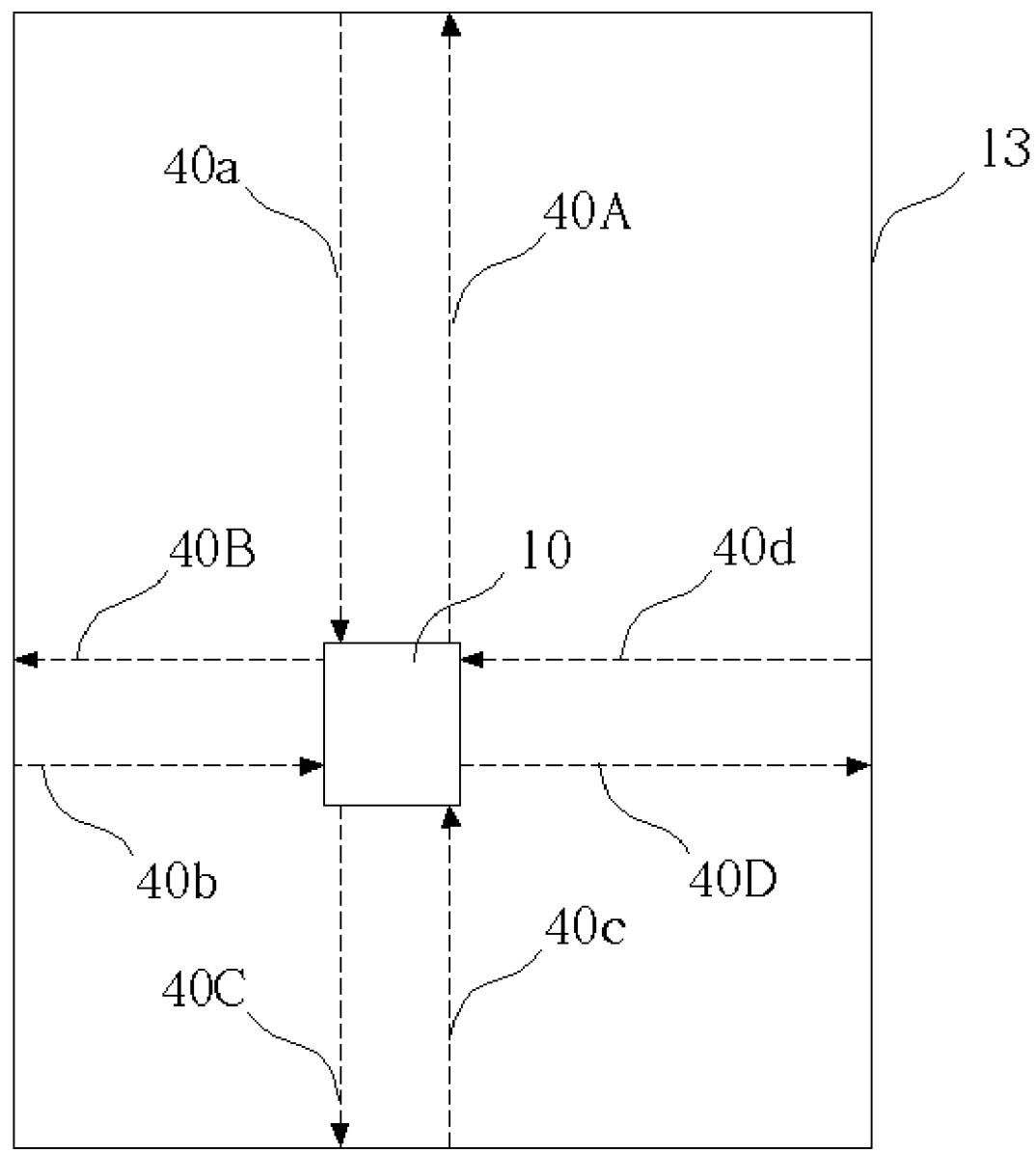
FIG. 3 illustrates the transmitter and the receiver of the projector transmitting and receiving detecting signals in an indoor space.

Please refer to FIG. 3. FIG. 3 illustrates the transmitter 16 and the receiver 18 of the projector 10 transmitting and receiving detecting signals in an indoor space 13. When the user operates the projector 10, the transmitter 16 will transmit a detecting signal 40A to the front and the signal 40a reflected will be received by the receiver 18. In the mean time, the decision module 25 detects the time at which the transmitter 16 transmits signal 40A and the receiver 18 receives signal 40a according to the time on the timer 24 and judges the actual distance from the projector 10 to the screen 11 by the time the transmitter 16 transmits the detecting signal 40A to the front of projector 10 and the receiver 18 receives signal 40a reflected from the front of projector 10.

Similarly, because the transmitter 16 is rotatable, it would transmit detecting signals 40B, 40C, 40D toward the left, right, and back side, and the receiver 18 would respectively receive the reflected signals 40b, 40c, and 40d sequentially. The decision module 25 would detect the time at which the transmitter 16 transmits signals 40B, 40C, 40D, and the time receiver 18 receives signals 40b, 40c, and 40d according to the time recorded by the timer 24. Then the decision module 25 would determine the actual distance from the projector 10 to the left, right, back side of indoor space 13 by calculating the interval from the transmitter 16 transmitting signals 40B, 40C, 40D toward the left, right and back side of the project 10, to the receiver 19 receives the reflected signals 40b, 40c, 40d from the left, right, and back side of the projector 10.

Figure 4:
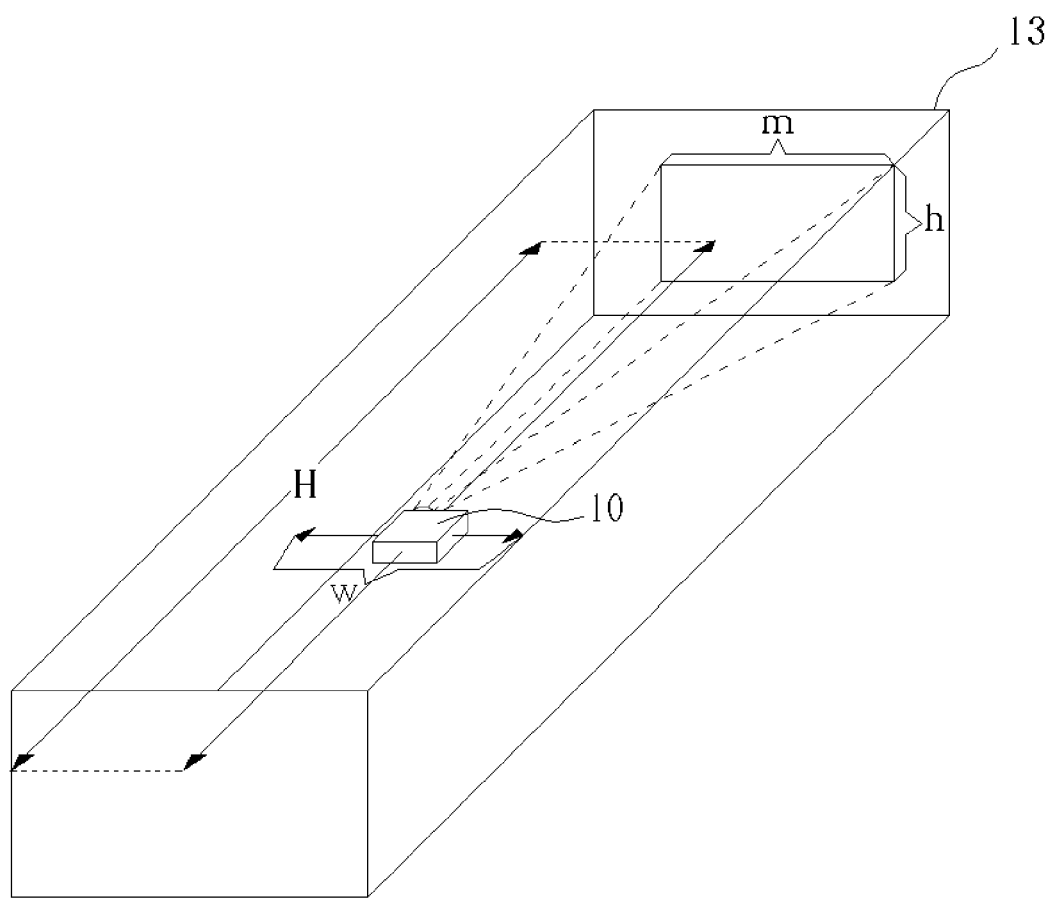
FIG. 4 is a graph illustrating an image projected by the projector.

Please refer to FIG. 4. FIG. 4 is a graph illustrating an image projected by the projector 10. While the width-height ratio of projected sizes depends on various types of the projectors, some being 4:3 and some 16:9. For convenience of explanation, the subsequent embodiment takes the projector with the ratio of 4:3. According to "Basic Guidelines For Room Layout For Representation" presented by Garry Musgrave in January, 2000, the recommended best height for projected images h is H/8, where H is the sum of the distances from the front side and back side of the indoor space 13 to the projector 10 determined by the decision module 25, and W is the sum of the distances from the right and left side of the indoor space 13, determined by the decision module 25 as well. Since the width-height ratio is 4:3, the best projected image width should be m=H/6.

Figure 5:
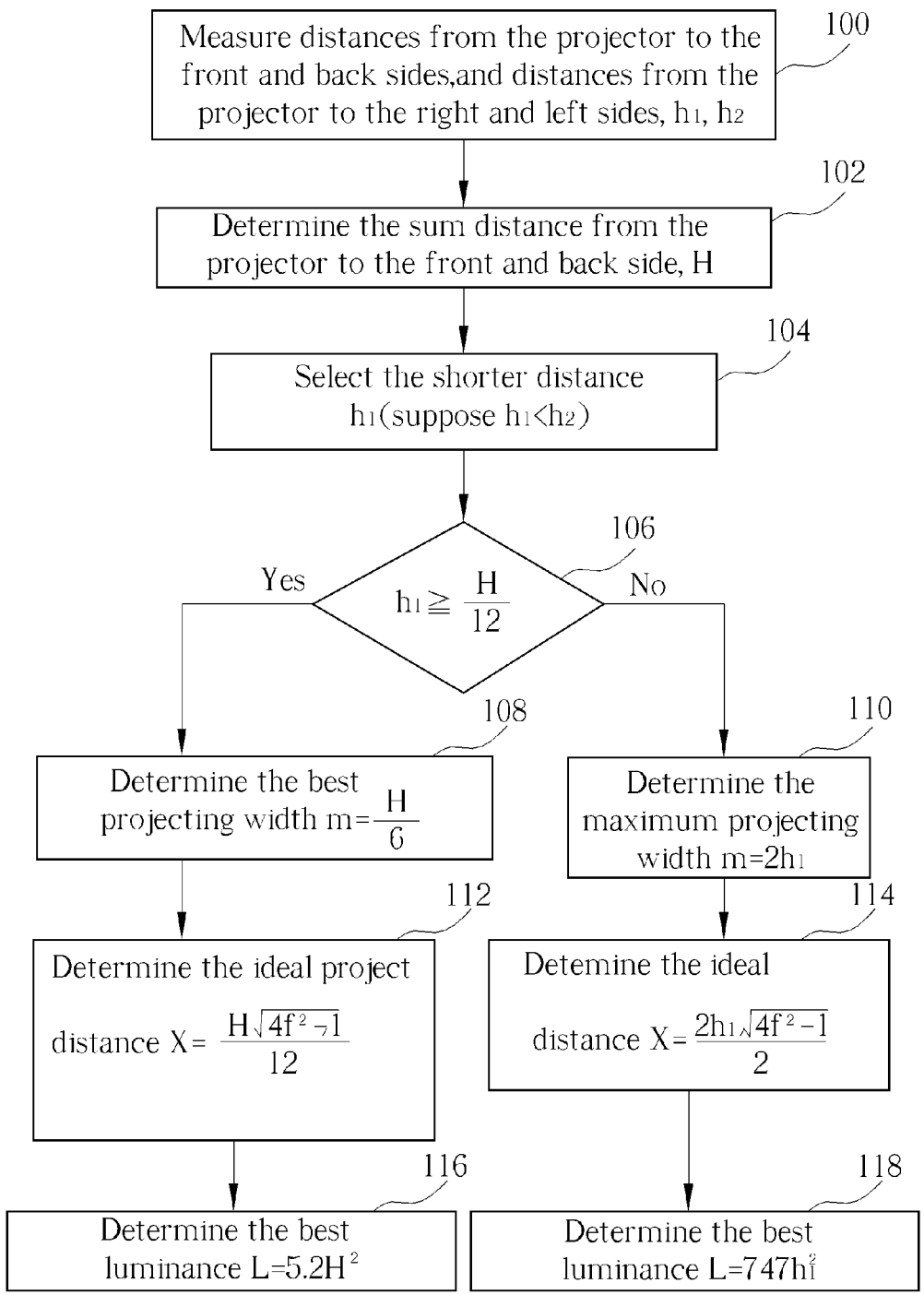
FIG. 5 is a flowchart of the best luminance and ideal projecting distance of the projector according to the present invention.
Figure 6:
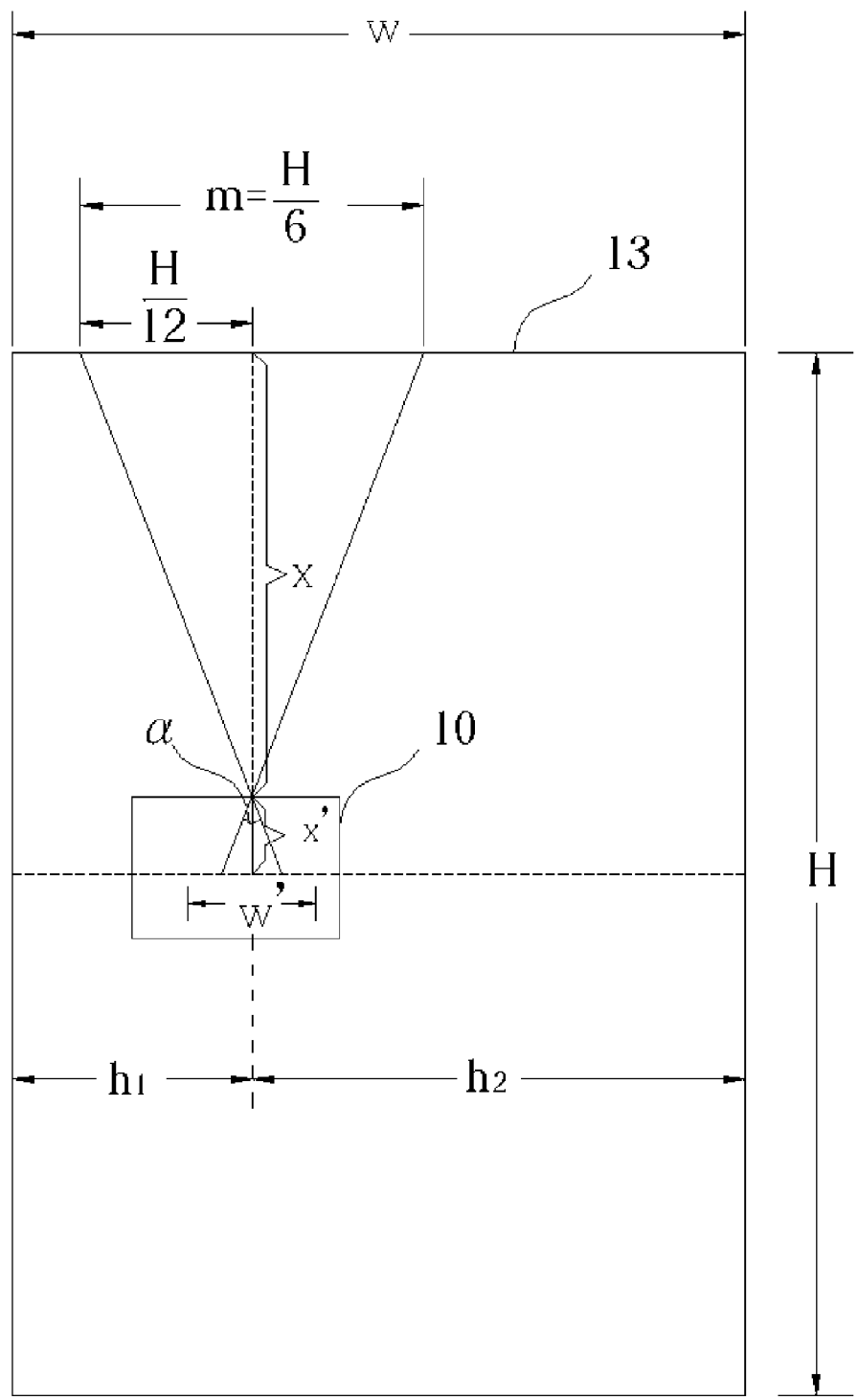
FIGS. 6 and 7 are graphs of calculation of the ideal distance from the projector to the screen.
Figure 7:
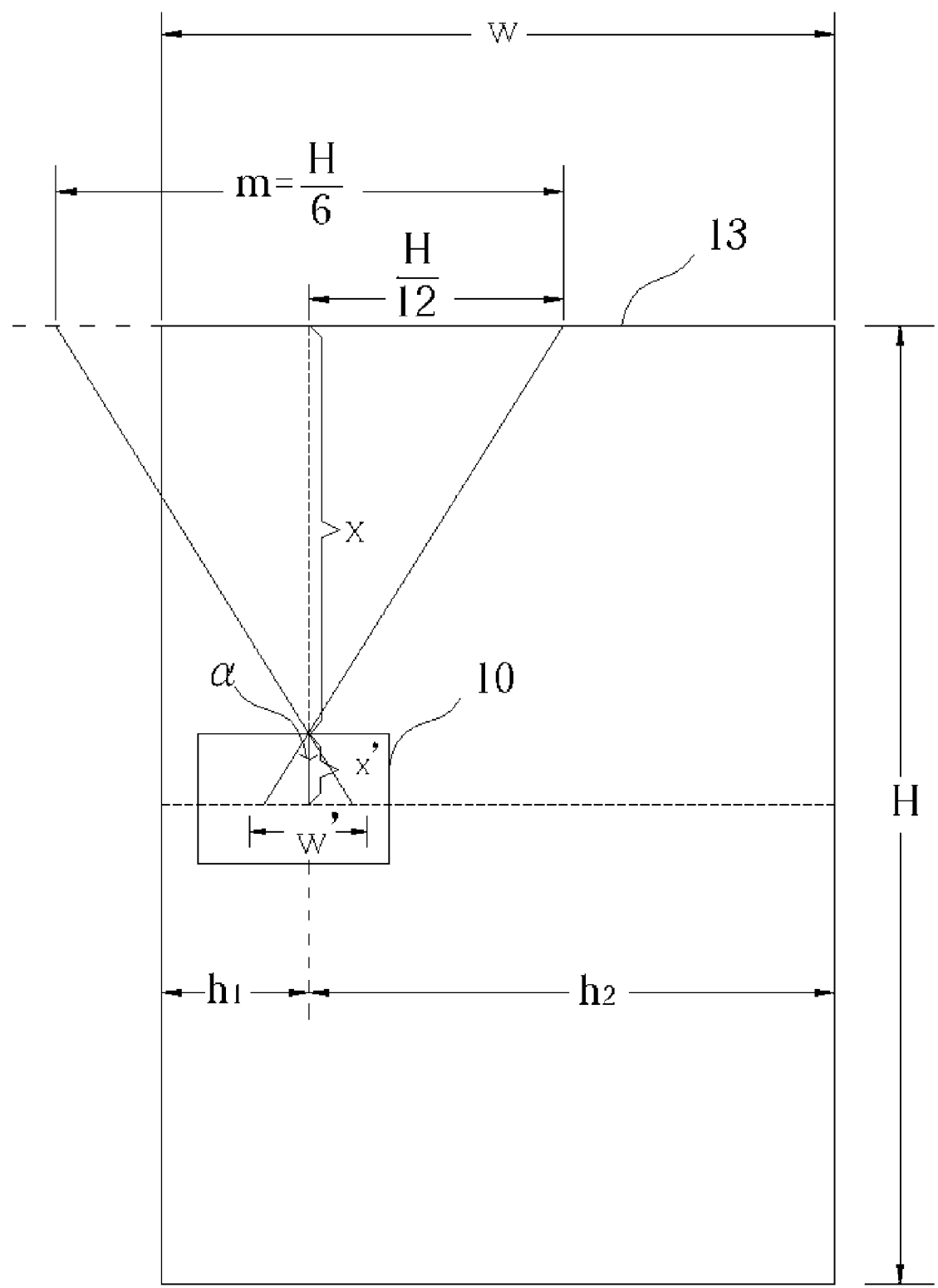

Please refer to FIGS. 5,6 and 7. FIG. 5 is a flowchart of the best luminance and ideal projecting distance of the projector 10 according to the present invention. FIGS. 6 and 7 are graphs of calculation of the ideal distance from the projector 10 to the screen 11, where w and H respectively represent the width and length of the indoor space 13; w represents the width of the light source of projector 10; x is the focal distance of the light source 28; $h_1$ and $h_2$ represent the distance from the projector 10 to the left and right side of the indoor space 13; and $\alpha$ is the angle and x is the ideal distance from the projector 10 to the screen 11. In this embodiment, the decision module 25 would determine the actual distances from the projector 10 to the left and right side, $h_1$ and $h_2$, according to the time at which transmitter 16 transmits detecting signals 40B and 40D toward the left and right side of the projector 10 and the time receiver 18 receives signals 40b and 40d reflected from the left and right side of the projector 10. (Step 100 in FIG. 5) The decision module 25 would also determine the sum of the distances from the front and back side to the projector 10, H. (Step 102 in FIG. 5) Thereafter, the processor 20 compares $h_1$ and $h_2$ and determines the shorter distance (Step 104 in FIG. 5), and takes that shorter distance to compare with m/2, or H/12. (Step 106 in FIG. 5) Under the assumption that $h_1<h_2$, the processor 20 would take $h_1$ to compare with m/2. When $h_1$ is larger than or equal to m/2, it is enough for the ideal projecting width m of the projector 10 to be projected in the indoor space 13 (as shown in FIG. 6), so that the best width of projected images for the projector 10 is m=H/6. (Step 108 in FIG. 5) When $h_1$ is shorter than m/2, the ideal width would exceed the maximum width of the projecting area provided by indoor space 13 (as shown in FIG. 7), and the best width of the projected images for projector 10 could only be $2h_1$. (Step 110 in FIG. 5)

After the width of projected images is decided, the processor 20 would calculate the ideal distance from the projector 10 to the screen 11, x, according to the chosen best width of projected images, m, and the term $$\sin\alpha = \frac{1}{2f}, \text{ where } f$$

is the magnifying ratio of the projector 10 (Equation 1).

The chosen m=H/6 is taken into the following Equations 2 and 3, that shows as follows:

$$\tan\alpha = \frac{1}{\sqrt{4f^2-1}} = \frac{\frac{w'}{2}}{x'} = \frac{m}{2x} \quad \text{(Equation 2)}$$

$$x = \frac{m}{2\tan\alpha} = \frac{m\sqrt{4f^2-1}}{2} = \frac{H\sqrt{4f^2-1}}{12}. \quad \text{(Equation 3)}$$

In the case of FIG. 6, the ideal projecting distance $$x = \frac{H\sqrt{4f^2-1}}{12}$$

is obtained.

(Step 112 in FIG. 5)

But it could also be the case in FIG. 7 that $h_1<m/2$ and the image projected by the projector 10 according to the ideal projecting width would exceed the area. In such cases, the projector 10 should be moved toward the projected image on the screen to shorten the actual projecting width or toward the center of indoor space 13 to match the actual projected image to the area of the best projected image m. If the user does not want to reposition the projector 10, it would take double the distance of the shorter of $h_1$ and $h_2$ to calculate the best projecting distance x. In other words, the m in Equation 2 and 3 would be replaced by $2h_1$. So the ideal projecting distance in FIG. 7.

$$x = \frac{2h_1\sqrt{4f^2-1}}{2}.$$

(Step 114 in FIG. 5)

Because the decision module 25 has previously obtained the actual distance from the projector 10 to the screen 11 based on the detecting signals 40A and 40a, the processor 20 makes a comparison between the ideal and actual distance and sends the result to the display device 22 which would output a displaying signal according to the difference between the two distances. The user can then place the projector 10 at the most appropriate position through the displaying signal.

Besides, in the article of "Projection Displays" presented by National Technology Roadmap for Flat Panel Displays, the suggested screen width and luminance are stated in the following chart:

| Largest audience size | Screen height (feet) | Screen luminance (lum) |
|---|---|---|
| 25 | 6 | 600 |
| 50 | 8 | 1200 |
| 100 | 12 | 2400 |
| 200 | 17 | 4750 |
| 500 | 26 | 12000 |

The luminance L can be defined as:

$$\overline{B}*A = \overline{B}*mh = \overline{B}*\frac{H}{6}\frac{H}{8} = \overline{B}*\frac{H^2}{48}, \quad \text{(Equation 4)}$$

where $\overline{B}$ is the luminous intensity and A is the area of the projected image.

For a conference room of 25 people, the needed projected image being approximately 1.3716 meters (4.5 feet) for height and 1.8288 meters (6 feet) for width, to maintain the required luminance L, due to 600 lum=$\overline{B_{25}}$*1.8288*1.371, the luminous intensity $\overline{B_{25}}$=240.

For a conference room of 50 people which is approximately 1.8288 meters (6 feet) for height and 2.4383 (8 feet) for width, due to 1200 lum=$\overline{B_{50}}$*2.4384*1.8288, the luminous intensity $\overline{B_{50}}$=269;

for a conference room of 200 people, which is 3.8862 (12.75 feet) for height and 3.6576 (12 feet) for width, due to 2400 lum=$\overline{B_{100}}$*3.6576*2.7432, the luminous intensity $\overline{B_{100}}$=240;

for a conference room of 500 people, which is 5.9436 meters (19.5 feet) for height and 7.9248 meters (26 feet) for width, due to 4750 lum=$\overline{B_{200}}$*5.1816*3.8862, the luminous intensity $\overline{B_{200}}$=236.

for a conference room of 500 people, which is 5.9436 meters (19.5 feet) for height and 7.9248 meters (26 feet) for width, due to 12000 lum=$\overline{B_{500}}$*7.9248*5.9436, the luminous intensity $\overline{B_{500}}$=255.

Therefore, for normal conference rooms of 25 to 500 people, $$\overline{B_{ave}} = (\overline{B_{25}} + \overline{B_{50}} + \overline{B_{100}} + \overline{B_{200}} + \overline{B_{500}})/5 = 249,$$

meaning that $\overline{B}_{ave}$ at 249 is fine. Afterward, take $\overline{B}_{ave}$ back into Equation 4 and get $$L = \overline{B_{ave}} * \frac{H^2}{48} = 249 * \frac{H^2}{48} = 5.2H^2.$$

When determining the length H, the projector 10 can calculate the proper required power for the light source 28 and accordingly control light source power supply 26 to provide the appropriate power to the light source 28.

Please refer to FIGS. 5 and 6 as well. In FIG. 6, the assumed projected image m=H/6, the processor 20 determines the projecting luminance based on the result of the comparison between $h_1$ and $h_2$. Since $h_1$ $\leq$ $h_2$ and $$2h_1 \geq m = \frac{H}{6},$$

results in L=5.2H².

(Step 116 in FIG. 5)

Please refer to FIG. 7. Under the circumstance that $h_1$ $\leq$ $h_2$, $$2h_1 < m = \frac{H}{6}$$

and the projector 10 is unmovable, the processor 20 would make a correction that the maximum projected image for the space could only be m'=2$h_1$. Since the width-height ration is 4:3, $$m' = \frac{3}{4} 2h_1$$

Taking m' back to Equation 4, therefore, $$L = \overline{B}*A =$$

$$\overline{B}*m'h = \overline{B}*2h_1\frac{3*2h_1}{4} = \overline{B}*\frac{3*(2h_1)^2}{4} = 249*\frac{3*(2h_1)^2}{4} = 747h_1^2.$$

Consequently, when $h_1 \leqq h_2$ and $$2h_1 < m = \frac{H}{6},$$

results in L=747 $h_1^2$.

(Step 118 in FIG. 5)

Please notice that although the assumed width-height ratio for the projector 10 in this embodiment is 4:3, the required luminance for different width-height ratios of the projector can still determine the corresponding average luminance $$\overline{B_{ave}}$$

with the above calculation. And since the projector 10 designed according to the average luminance, it is able to properly control the power of power supply 26, so that the light source 28 can emit the optimal luminance.

Figure 8:
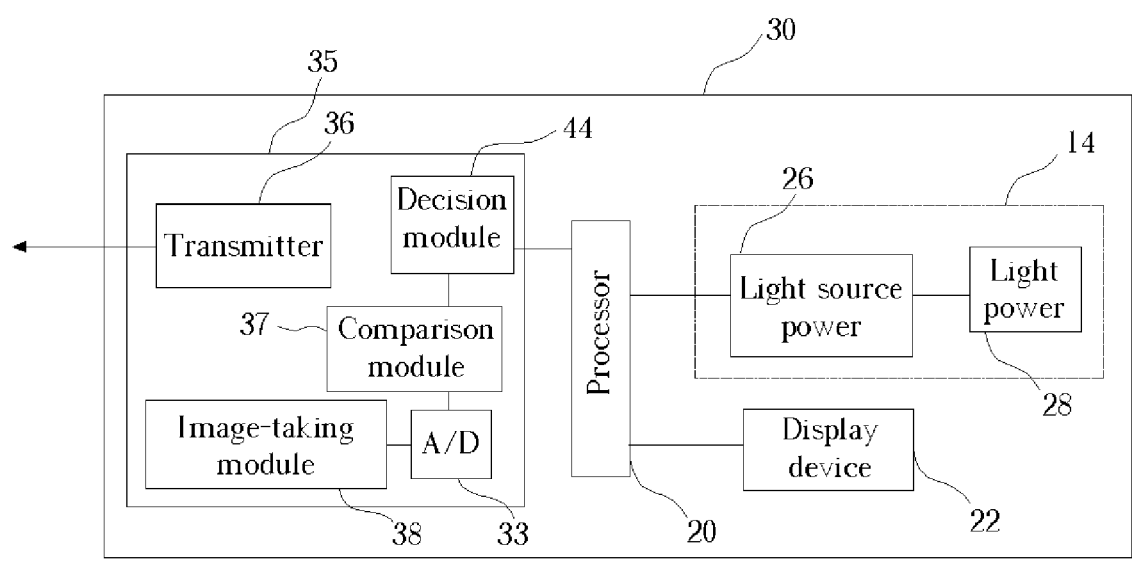
FIG. 8 is the functional block diagram of another embodiment projector according to the present invention.

Please refer to FIG. 8. FIG. 8 is the functional block diagram of another embodiment projector 30 according to the present invention. The projector 30 comprises an image module 14, a detecting module 35, a processor 20 and a display device 22. The detecting module 35 includes a transmitter 36, an image-taking module 38, an analog-to-digital converter 33, a comparison module 37, and a decision module 44. Because the detecting module 35 is rotatable, the transmitter 36 would transmit a beam to the front, back, left, and right of the projector 30 respectively, which is a laser beam, and the image-taking module 38 would obtain the analog image projected by the beams to the front, back, left, and right of the projector. Then, the received analog image would be converted to digital image by the analog-to-digital converter 33. After that, the comparison module 37 would compare the gray level of each pixel of the digital image and, finally, the decision module 44 would determine the distances from the projector 30 to the front, back, left, and right of it according to the position of the pixel of the highest gray level. The image module 14 includes a light source power supply 26 and a light source 28, and the image module 14 is used to project images to screen 11 in front of the projector 10.

Figure 9:
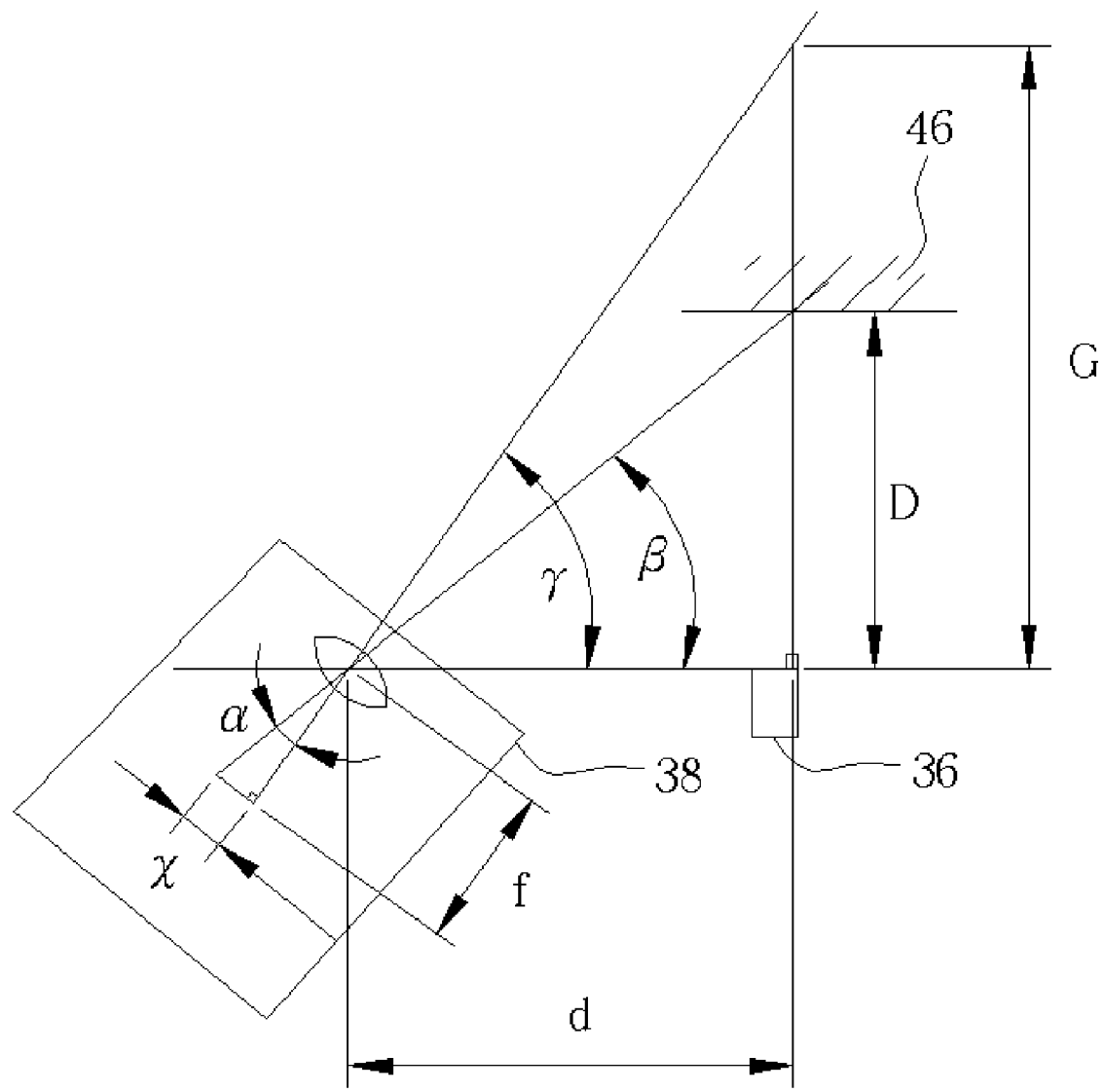
FIG. 9 is a graph that illustrates the distance detection of the detecting module.

Please refer to FIG. 9. FIG. 9 is a graph that illustrates the distance detection of the detecting module 35. In FIG. 9, D represents the distance from the transmitter 36 to an object 46; d is the distance between the transmitter 36 and the lens of image-taking module 38; f is the focal length if image-taking module 38; x is the center of luminance; G is the distance between the transmitter 36 and the intersection of the beam from the transmitter 36 and the light axis if image-taking module 38; α, β, γ are angles. For the convenience of explanation, FIG. 9 is exaggerated. In fact, D and G in FIG. 9 are far larger than f, x, d, and the image-taking module 38 and the transmitter 36 are both installed in the projector 30. The transmitter 36 would send a laser beam and project it on the object 46. After the image-taking module 46 takes the projected image by the laser beam, the image would be passed to the analog-to-digital converter 33 and the comparison module 37 for further processing. Because the laser beam has the strongest luminance under the operation environment of projectors, the position x where the laser beam is projected on the object 46 corresponding to the position of the image on the image-taking module 38, or luminance center, can be clearly marked. Therefore in FIG. 8 where parameters G, d, x, f are all known, the decision module 44 can calculate the wanted distance D with the following calculation:

$$\tan\alpha = \frac{x}{f},$$

$$\tan\gamma = \frac{G}{d},$$

$$\tan\beta = \frac{D}{d} = \tan(\gamma - \alpha),$$

$$D = d\tan\beta = d\tan(\gamma - \alpha) = d\frac{\tan\gamma - \tan\alpha}{1 - \tan\gamma\tan\alpha} = \frac{d(Gf - dx)}{df - Fx}$$

And, therefore, the detecting module 35 can obtain the distance from the projector 30 to the front, back, left, right sides of the projector 30 through the above method.

The only difference between the projector 10 and the projector 30 is the structures and the operations of the detecting module 25, 35. After the distance from the projectors to the front, back, left, right sides of the projectors is determined, the ways for the projector 30 that the processor 20 calculates the optimal projecting luminance and the ideal distance are all the same as that for the projector 10, not needing further explanation here.

Compared to prior art, after the detecting module determines the actual distance between the projector to the front, back, left and right side of the indoor space, the processor can obtain the best distance from the projector to the display screen and idealize the projecting luminance. Consequently, the present invention projector makes the operation more convenient.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A projector comprising:
   a housing;
   an image module installed within the housing for projecting an image toward a screen at the front side of the projector;
   a detecting module for detecting distances from the projector to the front side of the indoor space the projector is to project within and from the projector to the back side of the indoor space; and
   a processor connected with the detecting module for adjusting the luminance of the projecting image projected by the image module based on the distances from the projector to the front and back sides of the indoor space.

2. The projector of claim 1, wherein the detecting module comprises:
   a transmitter for emitting detecting signals toward the front side of the projector and the back side of the projector;
   a receiver for receiving the reflected detecting signals reflected from the front side of the projector and the back side of the projector; and
   a decision module for determining the distances from the projector to the front side of the indoor space, and from the projector to the back side of the indoor space.

3. The projector of claim 2, wherein the processor adjusts the luminance of the image projected by the image module based on the total distances from the projector to the front and back sides of the indoor space.

4. The projector of claim 2, wherein the transmitter further emits detecting signals toward the left and right sides of the projector, and thus the decision module determines the distances from the projector to the left and right sides of the indoor space based on the detecting signals to be emitted to the left and right sides of the projector by the transmitter, respectively.

5. The projector of claim 4, wherein the processor determines an ideal distance from the projector to the screen based on a shorter distance between the distances from the projector to the left and right sides of the indoor space, the projector further comprising a display device coupled to the processor for outputting a display signal based on a difference between an actual distance from the projector to the screen and the ideal distance from the projector to the screen.

6. The projector of claim 5, wherein the processor determines an ideal distance from the projector to the screen based on the shorter distance between the distances from the projector to the left and right sides of the indoor space, and a predetermined ratio of the total distances from the projector to the front side of the indoor space and from the projector to the back side of the indoor space.

7. The projector of claim 6, wherein if the shorter distance between the distances from the projector to the left and right sides of the indoor space is longer than or equal to the predetermined ratio of the total distances from the projector to the front side of the indoor space and from the projector to the back side of the indoor space, the luminance of the image projected by the image module is adjusted based on the total distances from the projector to the front and back sides of the indoor space; if the shorter distance between the distances from the projector to the left and right sides of the indoor space is shorter than the predetermined ratio of the total distances from the projector to the front and back sides of the indoor space, the image projected by the image module is adjusted based on the shorter distance between the distances from the projector to the left and right sides of the indoor space.

8. The projector of claim 1, wherein the detecting module comprises:
    a transmitter for emitting a beam toward the front side of the projector and the back side of the projector;
    an image-taking module for taking analog images projected by the beams to the front side of the projector and the back side of the projector;
    an analog-to-digital converter for transforming the taken analog image by the image-taking module into a digital image;
    a comparison module for comparing gray level of each pixel of the digital image; and
    a decision module for determining the distances from the projector to the front side of the indoor space, and from the projector to the back side of the indoor space.

9. The projector of claim 8, wherein the beam is a laser beam.

10. The projector of claim 8, wherein the transmitter further emits beams towards toward the left and right sides of the projector, the image-taking module taking analog images projected by the beams to the left and right sides of the projector, the analog-to-digital converter transforming the analog images taken by the image-taking module into a digital image, the comparison module comparing a gray level of each pixel of the digital image, and the decision module determining distances from the projector to the left and right sides of the indoor space based on the position of the pixel with highest gray level.

11. The projector of claim 1, wherein the detecting module is rotatable inside the housing for detecting distances from the projector outwards in various directions.

12. A projector comprising:
    a housing;
    an image module installed within the housing for projecting an image toward a screen at the front side of the projector;
    a detecting module for detecting distances from the projector to the front, back, left, and right sides of the indoor space the projector is to project within;
    a processor coupled with the detecting module for determining an ideal distance from the projector to the screen based on the distances from the projector to the front, back, left, and right sides of the indoor space; and
    a display device coupled to the processor for outputting a display signal based on the ideal distance from the projector to the screen.

13. The projector of claim 12, wherein the detecting module comprises:
    a transmitter for emitting detecting signals toward the front, back, left, and right sides of the projector;
    a receiver for receiving the reflected detecting signals from the front, back, left, and right sides of the projector; and
    a decision module for determining the distances from the projector to the front, back, left, and right sides of the indoor space based on the detecting signals emitted by the transmitter.

14. The projector of claim 12, wherein the detecting module comprises:
    a transmitter for emitting a beam toward the front, back, left, and right sides of the projector;
    an image-taking module for taking analog images projected by the beams to the front, back, left, and right sides of the projector;
    an analog-to-digital converter for transforming the taken analog image by the image-taking module into a digital image;
    a comparison module for comparing gray level of each pixel of the digital image; and
    a decision module for determining the distances from the projector to the front, back, left, and right sides of the indoor space, based on the position of the pixel with highest gray level.

15. The projector of claim 14, wherein the beam is a laser beam.

16. The projector of claim 12, wherein the processor determines an ideal distance from the projector to the screen based on a shorter distance between the distances from the projector to the left and right sides of the indoor space.

17. The projector of claim 16, wherein the processor determines an ideal distance from the projector to the screen based on the shorter distance between the distances from the projector to the left and right sides of the indoor space, and a predetermined ratio of the total distances from the projector to the front side of the indoor space and from the projector to the back side of the indoor space.

18. The projector of claim 16, wherein the processor adjusts the luminance of the image projected by the image module based on the distances from the projector to the front and back sides of the indoor space.

19. The projector of claim 18, wherein the processor adjusts the luminance of the image projected by the image module based on the total distances from the projector to the front and back sides of the indoor space.

20. The projector of claim 19, wherein if the shorter distance between the distances from the projector to the left and right sides of the indoor space is longer than or equal to the predetermined ratio of the total distances from the projector to the front side of the indoor space and from the projector to the back side of the indoor space, the luminance of the image projected by the image module is adjusted based on the total distances from the projector to the front and back sides of the indoor space; if the shorter distance between the distances from the projector to the left and right sides of the indoor space is shorter than the predetermined ratio of the total distances from the projector to the front side of the indoor space and from the projector to the back side of the indoor space, the image projected by the image module is adjusted based on the shorter distance between the distances from the projector to the left and right sides of the indoor space.

21. The projector of claim 12, wherein the detecting module is rotatable inside the housing for detecting distances from the projector outwards in various directions.

22. A method for adjusting an ideal projecting distance and projecting luminance of a projector comprising:
  (a) detecting distances from the projector to the front, back, left, and right sides of the indoor space the projector is to project within;
  (b) comparing the shorter distance between the distances from the projector to the left and right sides of the indoor space, and a predetermined ratio of the total distances from the projector to the front side of the indoor space and from the projector to the back side of the indoor space; and
  (c) determining a projecting parameter, based on the result of step (b).

23. The method of claim 22 further comprising;
  (d) controlling the operation of the projector based on the projecting parameter, wherein the projecting parameter indicates a width of an image projected by the projector, an ideal distance from the projector to the front side of the indoor space, or luminance of an image projected by the projector.

24. The method of claim 23, wherein the step (c) comprises:
  (c1) determining the projecting parameter based on the total distances from the projector to the front and back sides of the indoor space, if the shorter distance between the distances from the projector to the left and right sides of the indoor space is longer than or equal to the predetermined ratio of the total distances from the projector to the front side of the indoor space and from the projector to the back side of the indoor space; and
  (c2) determining the projecting parameter based on the shorter distance between the distances from the projector to the left and right sides of the indoor space, if the shorter distance between the distances from the projector to the left and right sides of the front space is shorter than the predetermined ratio of the total distances from the projector to the front side of the indoor space and from the projector to the back side of the indoor space.

* * * * *